United States Patent
Robertson

(10) Patent No.: US 10,856,538 B2
(45) Date of Patent: Dec. 8, 2020

(54) LURE STRIKE INDICATING ASSEMBLY

(71) Applicant: Randy Robertson, Carson City, NV (US)

(72) Inventor: Randy Robertson, Carson City, NV (US)

( * ) Notice: Subject to any disclaimer, the term of this patent is extended or adjusted under 35 U.S.C. 154(b) by 593 days.

(21) Appl. No.: 15/690,680

(22) Filed: Aug. 30, 2017

(65) Prior Publication Data

US 2019/0059346 A1 Feb. 28, 2019

(51) Int. Cl.
*A01K 93/00* (2006.01)
*A01K 93/02* (2006.01)
*A01K 91/06* (2006.01)
*A01K 97/12* (2006.01)

(52) U.S. Cl.
CPC .............. *A01K 93/02* (2013.01); *A01K 91/06* (2013.01); *A01K 93/00* (2013.01); *A01K 97/12* (2013.01)

(58) Field of Classification Search
CPC ......... A01K 93/00; A01K 91/06; A01K 97/12
USPC ... 43/43.1, 43.15, 44.87, 44.9, 44.91, 44.92, 43/44.93, 44.95, 17
See application file for complete search history.

(56) References Cited

U.S. PATENT DOCUMENTS

| D163,973 | S | 7/1951 | Smith | |
|---|---|---|---|---|
| 2,587,190 | A * | 2/1952 | Merriweather | A01K 93/02 43/17 |
| 2,609,633 | A | 9/1952 | Cracker | |
| 2,931,124 | A * | 4/1960 | Johnston | A01K 93/00 43/44.9 |
| 3,535,813 | A | 10/1970 | Cordell | |
| 3,765,118 | A * | 10/1973 | Reitler | A01K 91/08 43/43.12 |
| 4,031,652 | A * | 6/1977 | Johnson | A01K 91/08 43/43.12 |
| 4,177,599 | A * | 12/1979 | Pettersen | A01K 91/08 43/43.12 |
| 4,373,288 | A * | 2/1983 | McCrink | A01K 69/06 43/100 |

(Continued)

FOREIGN PATENT DOCUMENTS

| GB | 2073562 A | * | 10/1981 | ............. A01K 93/00 |
|---|---|---|---|---|
| GB | 2240698 A | * | 8/1991 | ............. A01K 93/00 |

(Continued)

OTHER PUBLICATIONS

Translation of JP 06-292493 (Year: 1994).*
Translation of JP 10-165059 (Year: 1998).*

*Primary Examiner* — Darren W Ark

(57) ABSTRACT

A lure strike indicating assembly for preventing obstruction of rod guides includes an indicator, a filament, and a coupler. The filament is coupled to and extends between the indicator and the coupler. The coupler is configured to slidably couple to a fishing line. A fastener is coupled to the indicator. The fastener is configured to selectively couple to the coupler and the fishing line so that the indicator is fixedly positioned relative to a lure that is coupled to an end of the fishing line. The fastener also is configured to decouple from the coupler and the fishing line in the event of a strike on the lure. The coupler is slidably positionable relative to the lure to prevent the indicator from obstructing a guide on a tip of a fishing rod to which the fishing line is coupled as the fishing line is retracted into a reel.

6 Claims, 4 Drawing Sheets

(56) References Cited

U.S. PATENT DOCUMENTS

| | | | | |
|---|---|---|---|---|
| 4,628,630 A * | 12/1986 | Bohme | A01K 91/08 24/115 M | |
| 4,916,850 A * | 4/1990 | Dodge | A01K 91/03 24/115 F | |
| 5,042,190 A * | 8/1991 | Calvin | A01K 93/00 43/43.1 | |
| 5,090,151 A | 2/1992 | Salminen | | |
| 5,117,576 A * | 6/1992 | Lasiter | A01K 93/00 43/44.9 | |
| 5,233,781 A * | 8/1993 | Bigelow | A01K 93/00 43/17 | |
| 5,784,829 A * | 7/1998 | Latta | A01K 93/00 43/44.87 | |
| 5,839,218 A * | 11/1998 | Cafarella | A01K 97/12 43/17 | |
| 5,950,348 A * | 9/1999 | Gruel | A01K 91/04 43/42.49 | |
| 6,370,809 B1 * | 4/2002 | Drew | A01K 97/12 43/17 | |
| 6,421,950 B1 * | 7/2002 | Constantin | A01K 91/12 43/44.98 | |
| 6,836,994 B1 * | 1/2005 | Fulper | A01K 97/12 43/17 | |
| 7,003,911 B2 * | 2/2006 | Schoenike | A01K 91/10 43/17 | |
| 7,490,433 B2 * | 2/2009 | Schoenike | A01K 91/10 43/17 | |
| 7,610,715 B2 * | 11/2009 | Cowin | A01K 93/02 43/44.87 | |
| 7,877,924 B2 * | 2/2011 | Schoenike | A01K 93/00 43/43.1 | |
| 7,963,065 B1 * | 6/2011 | Copeland | A01K 97/12 43/16 | |
| 8,272,159 B2 * | 9/2012 | Cowin | A01K 93/02 43/44.87 | |
| 8,276,311 B2 * | 10/2012 | Cowin | A01K 91/03 43/44.87 | |
| 8,720,105 B2 * | 5/2014 | Schoenike | A01K 91/16 43/43.1 | |
| 9,010,016 B2 * | 4/2015 | Cowin | A01K 93/02 43/44.87 | |
| 2007/0294934 A1 * | 12/2007 | Myers | A01K 85/02 43/44.9 | |

FOREIGN PATENT DOCUMENTS

| | | | | |
|---|---|---|---|---|
| GB | 2241419 A * | 9/1991 | | A01K 83/06 |
| GB | 2293300 A * | 3/1996 | | |
| JP | 06292493 A * | 10/1994 | | |
| JP | 07008144 A * | 1/1995 | | |
| JP | 08187044 A * | 7/1996 | | |
| JP | 08228652 A * | 9/1996 | | |
| JP | 08322443 A * | 12/1996 | | |
| JP | 08332009 A * | 12/1996 | | |
| JP | 10165059 A * | 6/1998 | | |
| JP | 11056186 A * | 3/1999 | | |
| JP | 2001008595 A * | 1/2001 | | |
| JP | 2001258446 A * | 9/2001 | | |
| JP | 2001299169 A * | 10/2001 | | |
| JP | 2002223683 A * | 8/2002 | | |
| JP | 2002272335 A * | 9/2002 | | |
| JP | 2003125684 A * | 5/2003 | | |
| JP | 2003304784 A * | 10/2003 | | |
| JP | 2005160460 A * | 6/2005 | | |
| JP | 2017104024 A * | 6/2017 | | |
| JP | 2019154355 A * | 9/2019 | | |
| WO | WO-9804125 A1 * | 2/1998 | | A01K 93/00 |
| WO | WO2004057956 | 7/2004 | | |
| WO | WO-2007002617 A2 * | 1/2007 | | A01K 93/02 |

* cited by examiner

LURE STRIKE INDICATING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to indicating assemblies and more particularly pertains to a new indicating assembly for preventing obstruction of rod guides.

BRIEF SUMMARY OF THE INVENTION

An embodiment of the disclosure meets the needs presented above by generally comprising an indicator, a filament, and a coupler. The filament is coupled to and extends between the indicator and the coupler. The coupler is configured to slidably couple to a fishing line. A fastener is coupled to the indicator. The fastener is configured to selectively couple to the coupler and the fishing line so that the indicator is fixedly positioned relative to a lure that is coupled to an end of the fishing line. The fastener also is configured to decouple from the coupler and the fishing line in the event of a strike on the lure. The coupler is slidably positionable relative to the lure to prevent the indicator from obstructing a guide on a tip of a fishing rod to which the fishing line is coupled as the fishing line is retracted into a reel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
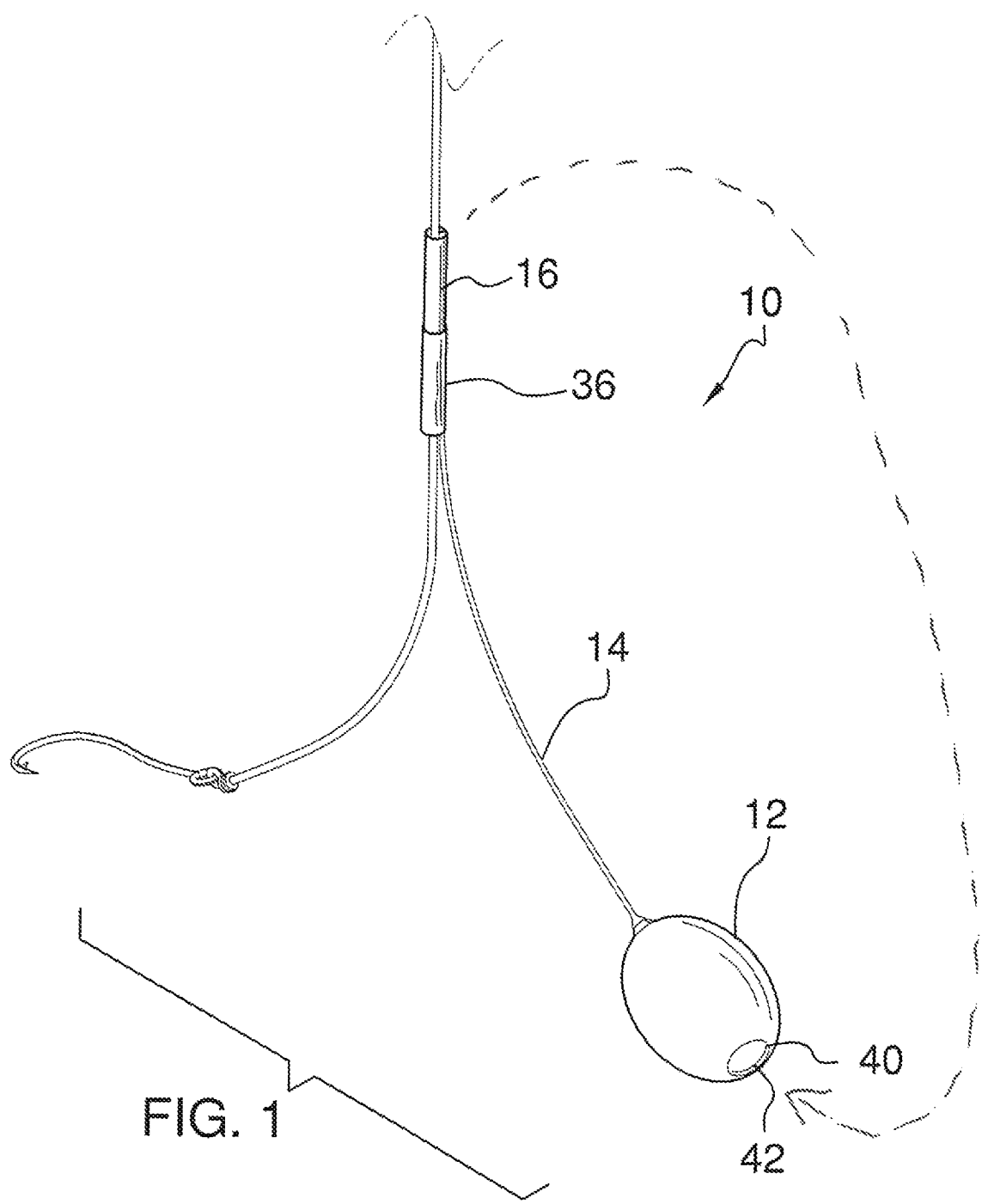
FIG. 1 is an isometric perspective view of a lure strike indicating assembly according to an embodiment of the disclosure.
Figure 2:
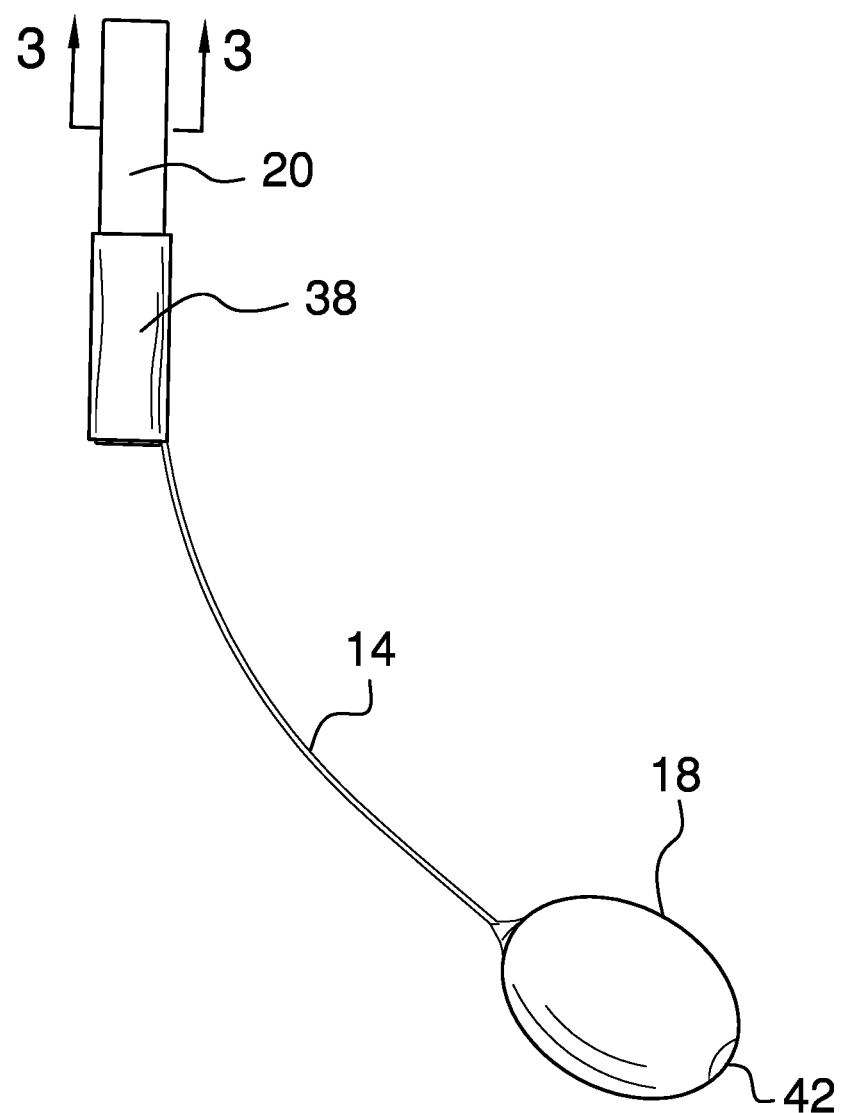
FIG. 2 is a side view of an embodiment of the disclosure.
Figure 3:
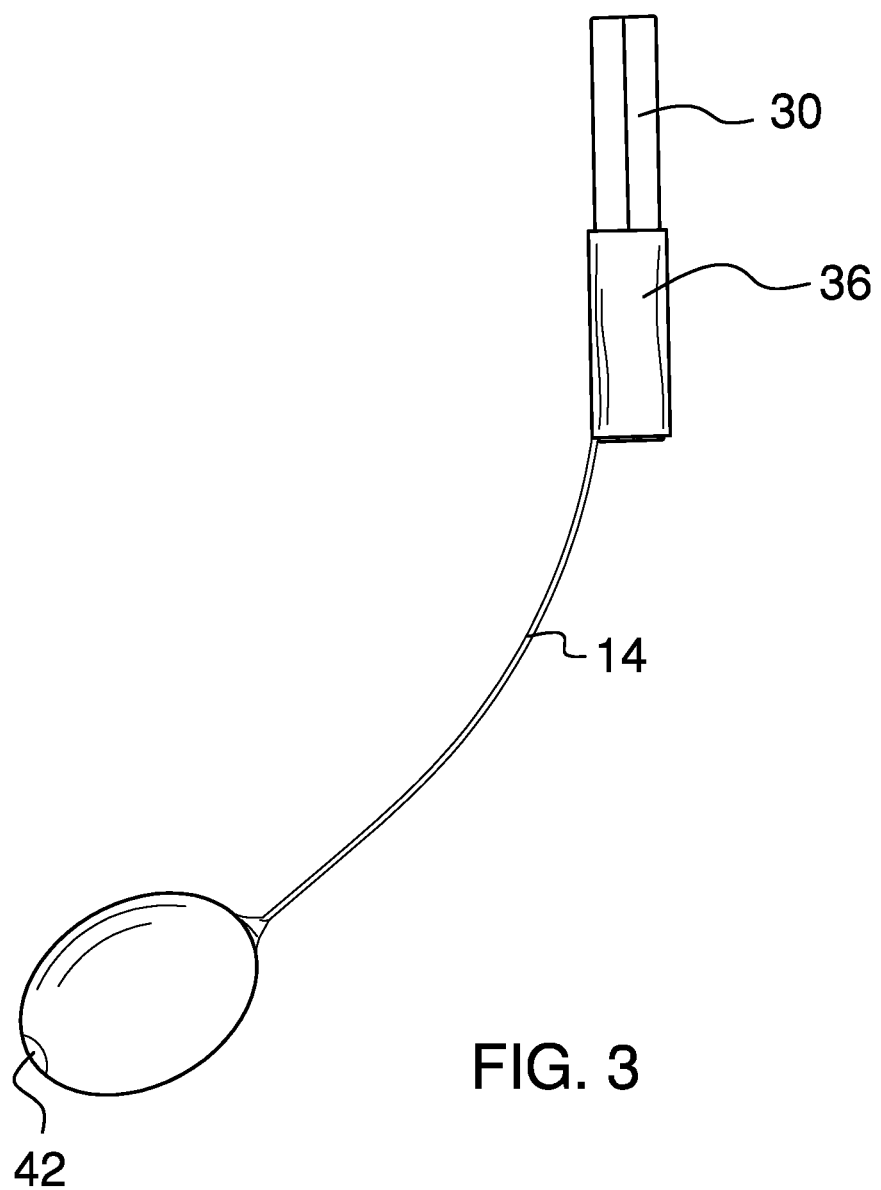
FIG. 3 is a side view of an embodiment of the disclosure.
Figure 4:
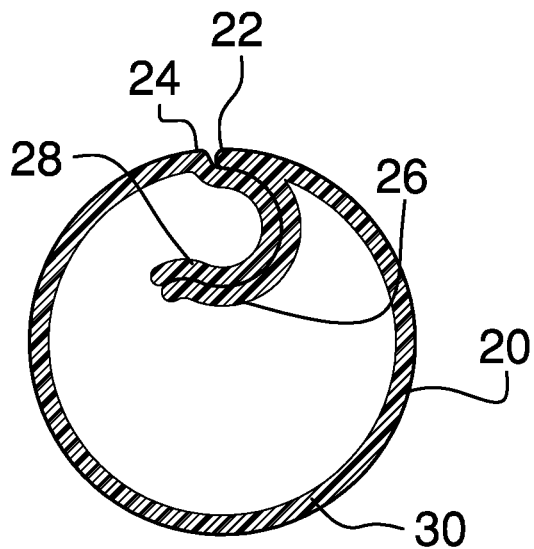
FIG. 4 is a cross-sectional view of an embodiment of the disclosure.
Figure 5:
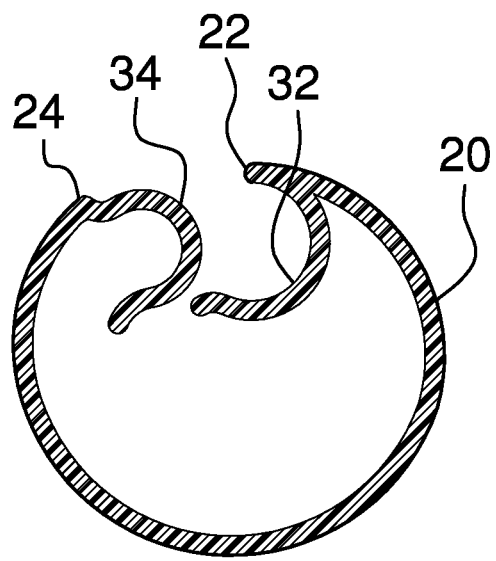
FIG. 5 is a cross-sectional view of an embodiment of the disclosure.

With reference now to the drawings, and in particular to FIGS. 1 through 5 thereof, a new indicating assembly embodying the principles and concepts of an embodiment of the disclosure and generally designated by the reference numeral 10 will be described.

As best illustrated in FIGS. 1 through 5, the lure strike indicating assembly 10 generally comprises an indicator 12, a filament 14, and a coupler 16. The filament 14 is coupled to and extends between the indicator 12 and the coupler 16. In one embodiment, the indicator 12 comprises a bobber 18.

The coupler 16 is coupled to the filament 14 distal from the indicator 12. The coupler 16 is configured to slidably couple to a fishing line so that the coupler 16 is slidably positionable along the fishing line. In one embodiment, the coupler 16 comprises a panel 20. The panel 20 is rectangularly shaped. The panel 20 is curved such that a first edge 22 and a second edge 24 of the panel 20 are proximately positioned. The panel 20 is resilient. The first edge 22 and the second edge 24 are configured to be separated to insert the fishing line and to rebound to position the panel 20 around the fishing line.

A first connector 26 is coupled to the first edge 22 of the panel 20. A second connector 28 is coupled to the second edge 24 of the panel 20. The second connector 28 is complementary to the first connector 26. The second connector 28 is positioned to selectively couple to the first connector 26 so that the panel 20 defines a tube 30 that is positioned around the fishing line. The tube 30 is slidably positionable along the fishing line.

In one embodiment, the first connector 26 comprises a first extrusion 32 that is coupled to and extends from the first edge 22. The first extrusion 32 is C-shaped when viewed longitudinally. The second connector 28 comprises a second extrusion 34 that is coupled to and extends from the second edge 24 of the panel 20. The second extrusion 34 is C-shaped and dimensionally smaller than the first extrusion 32. The first extrusion 32 is positioned to selectively insert the second extrusion 34. The tube 30 is positioned around and is slidably positionable along the fishing line. In another embodiment, the first extrusion 32 and the second extrusion 34 extend into the tube 30.

A third connector 36 is configured to couple to the coupler 16 and the filament 14 so that the filament 14 is fixedly coupled to the coupler 16. In one embodiment, the third connector 36 comprises a film 38. The film 38 comprises polymer plastic so that the film 38 is heat shrinkable. The film 38 is configured to wrap around the coupler 16 and the filament 14 and to be heated to shrink the film 38 around the coupler 16 and the filament 14 to couple the coupler 16 to the filament 14.

A fastener 40 is coupled to the indicator 12. The fastener 40 is configured to selectively couple to the coupler 16 and the fishing line so that the indicator 12 is fixedly positioned relative to a lure that is coupled to an end of the fishing line, such as a hook. The fastener 40 is configured to decouple from the coupler 16 and the fishing line in the event of a strike on the lure. The coupler 16 is slidably positionable relative to the lure to prevent the indicator 12 from obstructing a guide on a tip of a fishing rod to which the fishing line is coupled as the fishing line is retracted into a reel that is coupled to the fishing rod.

In one embodiment, the fastener 40 comprises a channel 42 that extends into the indicator 12. The channel 42 is substantially complementary to the tube 30. The channel 42 is configured to selectively insert the tube 30 and the fishing line to frictionally couple the tube 30 and the fishing line to the indicator 12. The indicator 12 is fixedly positioned relative to the lure. The lure, in the event of the strike, is configured to compel the tube 30 and the fishing line from the channel 42. The coupler 16 is slidably positionable relative to the lure to prevent the indicator 12 from obstructing the guide on the tip of the fishing rod to which the fishing line is coupled as the fishing line is retracted into the reel that is coupled to the fishing rod.

In use, the first edge 22 and the second edge 24 of the panel 20 are configured to be separated to insert the fishing line and to rebound to position the panel 20 around the fishing line. The first extrusion 32 is positioned to selectively insert the second extrusion 34 so that the tube 30 is positioned around the fishing line. The tube 30 is slidably positionable along the fishing line. The channel 42 is configured to selectively insert the tube 30 and the fishing line to frictionally couple the tube 30 and the fishing line to the indicator 12. The indicator 12 is fixedly positioned relative to the lure. The lure, in the event of the strike, is configured to compel the tube 30 and the fishing line from the channel 42. The coupler 16 is slidably positionable relative to the lure to prevent the indicator 12 from obstructing the guide on the tip of the fishing rod to which the fishing line is coupled as the fishing line is retracted into the reel that is coupled to the fishing rod.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

The invention claimed is:

1. A lure strike indicating assembly comprising:
an indicator, said indicator comprising a bobber;
a filament coupled to and extending from said indicator;
a coupler coupled to said filament distal from said indicator, said coupler being configured for slidably coupling to a fishing line, wherein said coupler is positioned on said filament such that said coupler is configured for coupling to the fishing line such that said coupler is slidably positionable along the fishing line, said coupler comprising:
a panel, said panel being rectangularly shaped, said panel being curved such that a first edge and a second edge of said panel are proximately positioned, said panel being resilient, wherein said first edge and said second edge are configured for separating for inserting the fishing line and for rebounding for positioning said panel around the fishing line,
a first connector coupled to said first edge of said panel,
a second connector coupled to said second edge of said panel, said second connector being complementary to said first connector, and
wherein said second connector is positioned on said panel such that said second connector is positioned for selectively coupling to said first connector such that said panel defines a tube positioned around the fishing line, wherein said tube is slidably positionable along the fishing line; and
a fastener coupled to said indicator, said fastener being configured for selectively coupling to said coupler and the fishing line such that said indicator is fixedly positioned relative to a lure coupled to an end of the fishing line, the lure comprising a hook, said fastener being configured for decoupling from said coupler and the fishing line in the event of a strike on the lure, such that said coupler is slidably positionable relative to the lure for preventing said indicator from obstructing a guide on a tip of a fishing rod to which the fishing line is coupled as the fishing line is retracted into a reel coupled to the fishing rod, said fastener comprising a channel extending into said indicator, said channel being substantially complementary to said tube, wherein said channel is positioned in said indicator such that said channel is configured for selectively inserting said tube and the fishing line for frictionally coupling said tube and the fishing line to said indicator such that said indicator is fixedly positioned relative to the lure, wherein the lure in the event of the strike is configured for compelling said tube and the fishing line from said channel such that said coupler is slidably positionable relative to the lure for preventing said indicator from obstructing the guide on the tip of the fishing rod to which the fishing line is coupled as the fishing line is retracted into the reel coupled to the fishing rod.

2. The assembly of claim 1, further comprising:
said first connector comprising a first extrusion coupled to and extending from said first edge, said first extrusion being C-shaped when viewed longitudinally;
said second connector comprising a second extrusion coupled to and extending from said second edge of said panel, said second extrusion being C-shaped and dimensionally smaller than said first extrusion; and wherein said second extrusion is positioned on said panel such that said first extrusion is positioned for selectively inserting said second extrusion such that said tube is positioned around the fishing line, wherein said tube is slidably positionable along the fishing line.

3. The assembly of claim 2, further including said first extrusion and said second extrusion extending into said tube.

4. The assembly of claim 1, further including a third connector configured for coupling to said coupler and said filament such that said filament is fixedly coupled to said coupler.

5. The assembly of claim 4, further including said third connector comprising a film, said film comprising polymer plastic such that said film is heat shrinkable, wherein said film is configured for wrapping around said coupler and said filament such that said film is configured for heating for shrinking said film around said coupler and said filament for coupling said coupler to said filament.

6. A lure strike indicating assembly comprising:
an indicator, said indicator comprising a bobber;
a filament coupled to and extending from said indicator;
a coupler coupled to said filament distal from said indicator, said coupler being configured for slidably coupling to a fishing line, wherein said coupler is positioned on said filament such that said coupler is configured for coupling to the fishing line such that said coupler is slidably positionable along the fishing line, said coupler comprising:
  a panel, said panel being rectangularly shaped, said panel being curved such that a first edge and a second edge of said panel are proximately positioned, said panel being resilient, wherein said first edge and said second edge are configured for separating for inserting the fishing line and for rebounding for positioning said panel around the fishing line,
  a first connector coupled to said first edge of said panel, and
  a second connector coupled to said second edge of said panel, said second connector being complementary to said first connector, wherein said second connector is positioned on said panel such that said second connector is positioned for selectively coupling to said first connector such that said panel defines a tube positioned around the fishing line, wherein said tube is slidably positionable along the fishing line, said first connector comprising a first extrusion coupled to and extending from said first edge, said first extrusion being C-shaped when viewed longitudinally, said second connector comprising a second extrusion coupled to and extending from said second edge of said panel, said second extrusion being C-shaped and dimensionally smaller than said first extrusion, wherein said second extrusion is positioned on said panel such that said first extrusion is positioned for selectively inserting said second extrusion such that said tube is positioned around the fishing line, wherein said tube is slidably positionable along the fishing line, said first extrusion and said second extrusion extending into said tube;

a third connector configured for coupling to said coupler and said filament such that said filament is fixedly coupled to said coupler, said third connector comprising a film, said film comprising polymer plastic such that said film is heat shrinkable, wherein said film is configured for wrapping around said coupler and said filament such that said film is configured for heating for shrinking said film around said coupler and said filament for coupling said coupler to said filament;

a fastener coupled to said indicator, said fastener being configured for selectively coupling to said coupler and the fishing line such that said indicator is fixedly positioned relative to a lure coupled to an end of the fishing line, the lure comprising a hook, said fastener being configured for decoupling from said coupler and the fishing line in the event of a strike on the lure, such that said coupler is slidably positionable relative to the lure for preventing said indicator from obstructing a guide on a tip of a fishing rod to which the fishing line is coupled as the fishing line is retracted into a reel coupled to the fishing rod, said fastener comprising a channel extending into said indicator, said channel being substantially complementary to said tube, wherein said channel is positioned in said indicator such that said channel is configured for selectively inserting said tube and the fishing line for frictionally coupling said tube and the fishing line to said indicator such that said indicator is fixedly positioned relative to the lure, wherein the lure in the event of the strike is configured for compelling said tube and the fishing line from said channel such that said coupler is slidably positionable relative to the lure for preventing said indicator from obstructing the guide on the tip of the fishing rod to which the fishing line is coupled as the fishing line is retracted into the reel coupled to the fishing rod.

* * * * *